United States Patent
Yoneda et al.

(10) Patent No.: US 6,815,520 B2
(45) Date of Patent: Nov. 9, 2004

(54) ADDITION CURING TYPE SILICONE RESIN COMPOSITION

(75) Inventors: Yoshinori Yoneda, Annaka (JP); Masaaki Yamaya, Takasaki (JP); Akinari Itagaki, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 15 days.

(21) Appl. No.: 10/090,608

(22) Filed: Mar. 6, 2002

(65) Prior Publication Data

US 2002/0161140 A1 Oct. 31, 2002

(30) Foreign Application Priority Data

Mar. 6, 2001  (JP) ........................................ 2001-062281

(51) Int. Cl.$^7$ ............................................. C08G 77/08
(52) U.S. Cl. ............................. 528/31; 528/32; 528/43
(58) Field of Search ............................... 528/31, 32, 43

(56) References Cited

U.S. PATENT DOCUMENTS 4,198,131 A * 4/1980 Birdsall et al. ............... 528/15

\* cited by examiner

*Primary Examiner*—Margaret G. Moore
(74) *Attorney, Agent, or Firm*—Oblon, Spivak, McClelland, Maier & Neustadt, P.C.

(57) ABSTRACT

An addition curing type silicone resin composition is provided including (A) 100 parts by weight of a specific organopolysiloxane with a phenyl group and at least two alkenyl groups within each molecule, (B) 1 to 100 parts by weight of a specific organohydrogenpolysiloxane with a phenyl group and at least two SiH groups within each molecule, and (C) an effective quantity of a hydrosilylation reaction catalyst. A cured product obtained by curing this composition is transparent, displays good strength and particularly good flexural strength, and moreover also displays a high degree of hardness. The composition is applicable to a variety of fields including electrical and electronic equipment, OA equipment and precision instruments.

11 Claims, No Drawings

ADDITION CURING TYPE SILICONE RESIN COMPOSITION

BACKGROUND OF THE INVENTION

1. Field of the Invention

The present invention relates to an addition curing type silicone resin composition useful in a variety of fields including electrical and electronic equipment, OA equipment and precision instruments.

2. Description of the Prior Art

Silicone resins are widely known as resins which display superior properties of heat resistance, cold resistance, electrical insulation, weather resistance, water repellency and transparency, and as such are widely used in a variety of fields including electrical and electronic equipment, OA equipment, motor vehicles, precision instruments, and building materials.

Furthermore in recent years, particularly transparent organic materials have been proposed as a potential alternative to inorganic glass materials in fields such as the manufacture of optical lenses, because they offer superior workability, and are lightweight, low cost and impact resistant. Amongst such transparent organic materials, silicone based resins are superior to other organic materials in terms of transparency and associated optical characteristics, and as such offer one of the most promising alternatives to inorganic glass materials and the like.

Amongst silicone resins, addition curing type silicone resin compositions such as those disclosed in Japanese Laid-open patent publication (kokai) No. 11-1619 (JP11-1619A) offer certain advantages, including being solventless and consequently offering superior moldability to solvent based condensation curing silicone materials such as silicone varnish, and moreover being more environmentally friendly due to the fact that they contain almost no solvent. Furthermore, because of the high degree of moldability they offer, silicone resins are also used in the production of key pads, although to enable their use in small, lightweight devices such as mobile telephones, the key pad member must be very thin, and as a result, further strength improvements in these key pad compositions are required.

However, silicone resin compositions such as those disclosed in Japanese Laid-open patent publication (kokai) No. 11-1619 (JP11-1619A) do not offer sufficient strength to enable their use in the type of applications described above.

SUMMARY OF THE INVENTION

In order to resolve the issues described above, an object of the present invention is to provide an addition curing type silicone resin composition which on curing produces a cured product which is transparent, displays good strength, and particularly good flexural strength, and moreover also displays a high degree of hardness.

As a result of intensive investigations aimed at resolving the aforementioned issues, the inventors of the present invention discovered that in order to increase the strength, particularly the flexural strength, and the hardness of a cured product, the cross linking density of the siloxane must be increased, and the π—π interactions between aromatic rings must also be considered as an important factor. The inventors also discovered that the aforementioned object of the present invention could be achieved by addition curing of specific organopolysiloxanes with a phenyl group and an alkenyl group, and specific organohydrogenpolysiloxanes with a phenyl group, and were consequently able to complete the present invention.

In other words, the present invention provides an addition curing type silicone resin composition comprising:

(A) 100 parts by weight of an organopolysiloxane represented by the average composition formula (1):

$$R^1_a R^2_b R^3_c SiO_{(4-a-b-c)/2} \quad (1)$$

(wherein, $R^1$ represents a phenyl group, $R^2$ represents an alkenyl group of 2 to 10 carbon atoms, $R^3$ represents a monovalent group selected from the group consisting of monovalent hydrocarbon groups with the exception of a phenyl group and alkenyl groups, a hydroxyl group and alkoxy groups, and a, b and c are positive numbers which satisfy the requirements $0.5 \leq a \leq 1.0$, $0.2 \leq b \leq 0.5$, $0.2 \leq c \leq 0.8$ and $1.0 < a+b+c < 2.0$), which incorporates a phenyl group and at least two alkenyl groups within a single molecule, and in which the combined proportion of Si atoms within $\equiv Si—R^2$ groups and $RSiO_{3/2}$ units (wherein, R represents either one of $R^1$ and $R^3$ as defined above) relative to the total number of Si atoms is at least 70 mol %;

(B) 1 to 100 parts by weight of an organohydrogenpolysiloxane represented by the average composition formula (2):

$$R^4_d H_e R^5_f SiO_{(4-d-e-f)/2} \quad (2)$$

(wherein, $R^4$ represents a phenyl group, $R^5$ represents a monovalent group selected from the group consisting of monovalent hydrocarbon groups with the exception of a phenyl group, a hydroxyl group and alkoxy groups, and d, e and f are positive numbers which satisfy the requirements $0.4 \leq d \leq 1.0$, $0.5 \leq e \leq 0.8$, $0.7 \leq f \leq 1.2$ and $1.8 < d+e+f < 3.0$), which incorporates a phenyl group and at least two SiH groups within a single molecule; and (C) an effective quantity of a hydrosilylation reaction catalyst.

DETAILED DESCRIPTION OF THE PREFERRED EMBODIMENTS

As follows is a more detailed description of the present invention.

Constituent (A)

Constituent (A), which is one of the essential constituents of an addition curing type silicone resin composition of the present invention, is an organopolysiloxane represented by the average composition formula (1):

$$R^1_a R^2_b R^3_c SiO_{(4-a-b-c)/2} \quad (1)$$

(wherein, $R^1$ represents a phenyl group, $R^2$ represents an alkenyl group of 2 to 10 carbon atoms, $R^3$ represents a monovalent group selected from the group consisting of monovalent hydrocarbon groups with the exception of a phenyl group and alkenyl groups, a hydroxyl group and alkoxy groups, and a, b and c are positive numbers which satisfy the requirements $0.5 \leq a \leq 1.0$, $0.2 \leq b \leq 0.5$, $0.2 \leq c \leq 0.8$ and $1.0 < a+b+c < 2.0$), which incorporates a phenyl group and at least two alkenyl groups within a single molecule, and in which the combined proportion of Si atoms within $\equiv Si—R^2$ groups and $RSiO_{3/2}$ units (wherein R represents either $R^1$ or $R^3$) relative to the total number of Si atoms is at least 70 mol %.

In the average composition formula (1), as is evident from the relationship $1.0 < a+b+c < 2.0$ (namely, $2.0/2 < (4-a-b-c)/2 < 3.0/2$), this organopolysiloxane is a branched type structure or a three dimensional network structure with either one type, or two or more types, of $RSiO_{3/2}$ units and $SiO_2$ units within the molecule, and the alkenyl group represented by the $R^2$ of the $\equiv Si-R^2$ group undergoes a hydrosilylation reaction with the hydrogen of the organohydrogenpolysiloxane represented by the average composition formula (2), thereby forming further branching or three dimensional network structures. Values of a, b and c which satisfy the requirement 1.3<a+b+c<1.7 are preferred. Furthermore, even if this organopolysiloxane incorporates $R^2SiO_{3/2}$ units, the terminals may be blocked with $R^3{}_3SiO_{1/2}$ units.

In the average composition formula (1), $R^1$ represents a phenyl group and $R^2$ represents an alkenyl group of 2 to 10 carbon atoms. Examples of suitable alkenyl groups include vinyl groups, allyl groups, propenyl groups, isopropenyl groups and butenyl groups, and of these, vinyl groups are preferred.

Furthermore, in the average composition formula (1), $R^3$ represents a monovalent group selected from the group consisting of monovalent hydrocarbons group with the exception of a phenyl group and alkenyl groups, a hydroxyl group and alkoxy groups. Examples of such hydrocarbon groups, which may be the same or different, include substituted or unsubstituted monovalent hydrocarbons of 1 to 20, and preferably 1 to 10 carbon atoms. Specific examples of such hydrocarbon groups include alkyl groups such as methyl groups, ethyl groups, propyl groups, isopropyl groups, butyl groups, tert-butyl groups and hexyl groups; other saturated hydrocarbon groups including cycloalkyl groups such as cyclohexyl groups; aryl groups excluding phenyl groups such as tolyl groups, xylyl groups and naphthyl groups; aralkyl groups such as benzyl groups and phenylethyl groups; halogen substituted hydrocarbon groups such as 3,3,3-trifluoropropyl groups; and cyano substituted hydrocarbons. Examples of alkoxy groups include unsubstituted alkoxy groups such as methoxy groups, ethoxy groups, propoxy groups and phenoxy groups, as well as alkoxy substituted alkoxy groups such as methoxyethoxy groups and ethoxyethoxy groups. Of these groups, methyl groups, ethyl groups, and propyl groups are particularly preferred.

In the average composition formula (1), the number a, which represents the phenyl group content, should satisfy the requirement $0.5 \leq a \leq 1.0$, and preferably the requirement $0.55 \leq a \leq 0.95$. If the phenyl group content is less than this range, then the cured product does not achieve the necessary flexural strength or hardness, whereas if the phenyl content is too high, then not only does the cured product not have the necessary flexural strength or hardness, but the increase in the viscosity of the composition also causes a deterioration in the workability.

In the average composition formula (1), the number b, which represents the alkenyl group content, should satisfy the requirement $0.2 \leq b \leq 0.5$, and preferably the requirement $0.25 \leq b \leq 0.45$. If the value of b is less than 0.2, then the reaction cured product does not achieve the necessary flexural strength or hardness, whereas if the value of b is greater than 0.5, then the number of cross linking points becomes too large, and the reaction cured product becomes brittle. Furthermore, because the organopolysiloxane represented by the average composition formula (1) undergoes a hydrosilylation reaction with the organohydrogenpolysiloxane represented by the average composition formula (2) to form a cross linked structure, there must be at least two alkenyl groups within each molecule of the organopolysiloxane represented by the average composition formula (1).

In the average composition formula (1), the number c, which represents the amount of the monovalent group represented by $R^3$, should satisfy the requirement $0.2 \leq c \leq 0.8$, and preferably the requirement $0.25 \leq c \leq 0.7$, in order to ensure that the addition curing type silicone resin composition has a suitable viscosity for ensuring the necessary workability, and moreover has a favorable three dimensional network structure following curing.

In order for a heat cured product of a composition of the present invention to display the necessary degree of strength and hardness, the values of a, b and c must satisfy the conditions described above, and in addition, the combined proportion of Si atoms within $\equiv Si-R^2$ groups and $RSiO_{3/2}$ units (wherein, R represents either $R^1$ or $R^3$) relative to the total number of Si atoms in the organopolysiloxane represented by the average composition formula (1), which represents a measure of the cross linking and branching within the cured product, should be at least 70 mol %, and preferably between 75 and 95 mol %.

Constituent (B)

Constituent (B), which is one of the essential constituents of an addition curing type silicone resin composition of the present invention, is an organohydrogenpolysiloxane represented by the average composition formula (2),

$$R^4{}_dH_eR^5{}_fSiO_{(4-d-e-f)/2} \qquad (2)$$

(wherein, $R^4$ represents a phenyl group, $R^5$ represents a monovalent group selected from the group consisting of monovalent hydrocarbon groups with the exception of a phenyl group, a hydroxyl group and alkoxy groups, and d, e and f are positive numbers which satisfy the requirements $0.4 \leq d \leq 1.0$, $0.5 \leq e \leq 0.8$, $0.7 \leq f \leq 1.2$ and $1.8 < d+e+f < 3.0$), which incorporates a phenyl group and at least two SiH groups within a single molecule.

In the average composition formula (2), $R^4$ represents a phenyl group, and $R^5$ represents a monovalent group selected from the group consisting of monovalent hydrocarbon groups with the exception of a phenyl group and a hydrogen atom, a hydroxyl group and alkoxy groups. Examples of such hydrocarbon groups, which may be the same or different, include substituted or unsubstituted monovalent hydrocarbons of 1 to 20, and preferably 1 to 10 carbon atoms. Specific examples of such hydrocarbon groups include alkyl groups such as methyl groups, ethyl groups, propyl groups, isopropyl groups, butyl groups, tert-butyl groups and hexyl groups; other saturated hydrocarbon groups including cycloalkyl groups such as cyclohexyl groups; aryl groups excluding phenyl groups such as tolyl groups, xylyl groups and naphthyl groups; aralkyl groups such as benzyl groups and phenylethyl groups; halogen substituted hydrocarbon groups such as 3,3,3-trifluoropropyl groups; and cyano substituted hydrocarbons. Examples of alkoxy groups include unsubstituted alkoxy groups such as methoxy groups, ethoxy groups, propoxy groups and phenoxy groups, as well as alkoxy substituted alkoxy groups such as methoxyethoxy groups and ethoxyethoxy groups. Of these groups, methyl groups, ethyl groups, and propyl groups are particularly preferred.

In the average composition formula (2), the number d, which represents the phenyl group content, should satisfy the requirement $0.4 \leq d \leq 1.0$, and preferably the requirement $0.5 \leq d \leq 1.0$. If the value of d is less than 0.4, then the reaction cured product does not achieve the necessary strength, whereas if the value is greater than 1.0, the curability of the composition deteriorates and so the reaction cured product does not achieve the necessary hardness or strength.

In the average composition formula (2), the number e, which represents the amount of silicon atom bonded hydrogen atoms should satisfy the requirement $0.5 \leq e \leq 0.8$, and preferably the requirement $0.6 \leq e \leq 0.8$. If the value of e is less than 0.5, then the reaction cured product does not achieve the necessary hardness, whereas if the value is greater than 0.8, then not only does the number of cross linking points become too large and the reaction cured product become brittle, but the compatibility with the constituent (A) also deteriorates. Furthermore, the constituent (B) functions as a cross linking agent for the constituent (A), and must consequently incorporate at least two SiH groups within each molecule.

In the average composition formula (2), the number f, which represents the amount of the monovalent group represented by $R^5$, should satisfy the requirement $0.7 \leq f \leq 1.2$, and preferably the requirement $0.8 \leq f \leq 1.1$. If the value of f is less than 0.7, then the hardness of the cured product is insufficient, whereas if the value is greater than 1.2, both the hardness and the strength of the cured product are unsatisfactory.

In the average composition formula (2), the values of d, e and f should also satisfy the requirement $1.8<d+e+f<3.0$, and preferably the requirement $2.0<d+e+f<2.5$. In order to ensure a suitable degree of workability following mixing with the constituent (A), the constituent (B) should preferably be of low viscosity, and provided the requirement $1.8<d+e+f<3.0$ is satisfied, the number of straight chain structures is large and the viscosity can be kept low. This organohydrogenpolysiloxane may also incorporate branched structures within the molecule.

The proportion of the constituent (B) used relative to 100 parts by weight of the constituent (A) should be from 1 to 100 parts by weight, with amounts from 5 to 50 parts by weight being preferred. Furthermore, the amount of silicon atom bonded hydrogen atoms (in other words, SiH groups) within the constituent (B) relative to 1 mol of alkenyl groups within the constituent (A) should be from 0.5 to 3 mols, and preferably from 0.7 to 2.0 mols.

Constituent (C)

The hydrosilylation reaction catalyst of the constituent (C) is a cross linking catalyst which promotes a hydrosilylation reaction between the alkenyl groups of the constituent (A) and the silicon atom bonded hydrogen atoms (in other words, SiH groups) of the constituent (B). Suitable examples include platinum based catalysts such as platinum black, platinum (II) chloride, chloroplatinic acid, reaction products of chloroplatinic acid and mohohydric alcohols, coordination compounds of chloroplatinic acid with olefins, and platinum bisacetoacetate, as well as other platinum group metal catalysts such as palladium based catalysts and rhodium based catalysts. This hydrosilylation reaction catalyst is used in quantities which offer effective catalytic action (so-called catalytic quantity), so that the quantity of the catalyst, calculated in terms of the amount of the metal, is typically 1 to 500 ppm, and preferably 2 to 100 ppm, relative to the amount of the constituent (A).

In a composition of the present invention, in addition to the constituents (A) to (C) described above, other materials such as hydrosilylation control agents for improving the hardness or the pot life, and reactive or unreactive straight chain or cyclic low molecular weight organopolysiloxanes for regulating the hardness and the viscosity may also be added, provided such additions do not impair the effects of the present invention.

Furthermore, inorganic fillers such as finely powdered silica or titanium oxide, as well as pigments, flame retardants, heat resistant materials and oxidation resistant materials may also be added if necessary.

From the viewpoints of curability and workability, an addition curing type silicone resin composition of the present invention should have a viscosity of no more than 500 P, and preferably from 1 to 350 P.

An addition curing type silicone resin composition of the present invention cures rapidly on heating, and following heat curing for two hours at 200° C., the cured product displays a flexural strength, measured in accordance with JIS K6911, of at least 29.4 MPa (3.00 kgf/mm$^2$), and a hardness, measured using a Barcol hardness tester in accordance with JIS K7060, of at least 60 at Shore D.

In order to ensure that a cured product of an addition curing type silicone resin composition of the present invention has a Shore D hardness of at least 60, the combined proportion of Si atoms within $\equiv$Si—$R^2$ groups and $RSiO_{3/2}$ units (wherein, R represents either $R^1$ or $R^3$) relative to the total number of Si atoms must be at least 70 mol %, and moreover the number of silicon atom bonded hydrogen atoms relative to each Si atom within the constituent (B) must be within a range from 0.5 to 0.8 ($0.5 \leq e \leq 0.8$). Furthermore, by setting a Shore D hardness of at least 60 as a required condition, and increasing the phenyl group content of the constituent (A) and the constituent (B), high flexural strength values of at least 29.4 MPa (3.00 kgf/mm$^2$), or where necessary 34.3 MPa or even 39.2 MPa can be achieved.

In order to ensure that a cured product obtained by heat curing of an addition curing type silicone resin composition of the present invention displays the desired transparency, the constituent (A) and the constituent (B) must display good compatibility, the refractive index of both the constituent (A) and the constituent (B) should preferably be from 1.47 to 1.57, and in particular, the difference in the refractive indexes of the constituent (A) and the constituent (B) should preferably be no more than 0.08. A cured product produced by heat curing of a composition containing only this type of constituent (A) and constituent (B), together with a constituent (C), is highly transparent and displays a transmittance of at least 85% at a wavelength of 589 nm.

EXAMPLES

As follows is a description of specifics of the present invention using a series of examples and comparative examples. However, the present invention is in no way limited to the examples presented. In the examples below, flexural strength was measured in accordance with JIS K6911, hardness was measured using a Barcol hardness tester at Shore D and in accordance with JIS K7060, refractive index was measured using an Abbe refractometer (1T manufactured by Atago Co., Ltd.), and transmittance was measured using a recording spectrophotometer (U-3400 manufactured by Hitachi Ltd.).

Synthetic Example 1

Synthesis of an Alkenyl Group Containing Organopolysiloxane

A mixture of 54.0 g (55 mol %) of phenyltrichlorosilane, 24.7 g (15 mol %) of dimethyldichlorosilane and 148.4 g (30 mol %) of methylvinyldichlorosilane was added dropwise over a one hour period to a flask containing a solvent mixture of 500 g of water and 200 g of toluene which had been heated to 80° C. Following completion of the addition, the mixture was aged for a further two hours to yield a toluene solution of a cohydrolysis-condensation product. This solution was left to stand until it had cooled to room temperature, and the separated aqueous layer was then removed. A water washing operation in which the toluene solution was combined with water, stirred, left to stand, and the water layer subsequently removed, was repeated until the toluene layer was neutral, thereby halting any further reaction. The thus obtained toluene solution of a organopolysiloxane was filtered to remove impurities, and the toluene was then removed by vacuum distillation to yield 125 g of an alkenyl group containing organopolysiloxane represented by an average composition formula (A) shown below, with a refractive index of 1.5263.

$$(C_6H_5)_{0.55}(CH_2=CH)_{0.30}(CH_3)_{0.60}SiO_{1.275} \quad (A)$$

Synthetic Example 2
Synthesis of an Alkenyl Group Containing Organopolysiloxane Using the same procedure as the synthetic example 1, cohydrolysis of a mixture of 55 mol % of phenyltrichlorosilane, 15 mol % of diphenyldichlorosilane and 30 mol % of methylvinyldichlorosilane yielded an alkenyl group containing organopolysiloxane represented by an average composition formula (B) shown below, with a refractive index of 1.5569.

$$(C_6H_5)_{0.85}(CH_2=CH)_{0.30}(CH_3)_{0.30}SiO_{1.275} \quad (B)$$

Synthetic Example 3
Synthesis of an Alkenyl Group Containing Organopolysiloxane Using the same procedure as the synthetic example 1, cohydrolysis of a mixture of 45 mol % of phenyltrichlorosilane, 15 mol % of diphenyldichlorosilane and 40 mol % of methylvinyldichlorosilane yielded an alkenyl group containing organopolysiloxane represented by an average composition formula (C) shown below, with a refractive index of 1.5450.

$$(C_6H_5)_{0.75}(CH_2=CH)_{0.40}(CH_3)_{0.40}SiO_{1.225} \quad (C)$$

Synthetic Example 4
Synthesis of an Alkenyl Group Containing Organopolysiloxane Using the same procedure as the synthetic example 1, cohydrolysis of a mixture of 40 mol % of phenyltrichlorosilane, and 60 mol % of methylvinyldichlorosilane yielded an alkenyl group containing organopolysiloxane represented by an average composition formula (D) shown below, with a refractive index of 1.5070.

$$(C_6H_5)_{0.40}(CH_2=CH)_{0.60}(CH_3)_{0.60}SiO_{1.20} \quad (D)$$

Synthetic Example 5
Synthesis of an Alkenyl Group Containing Organopolysiloxane Using the same procedure as the synthetic example 1, cohydrolysis of a mixture of 10 mol % of methyltrichlorosilane, 40 mol % of phenyltrichlorosilane, 42 mol % of dimethyldichlorosilane and 8 mol % of methylvinyldichlorosilane yielded an alkenyl group containing organopolysiloxane represented by an average composition formula (E) shown below, with a refractive index of 1.5150.

$$(C_6H_5)_{0.40}(CH_2=CH)_{0.08}(CH_3)_{1.02}SiO_{1.25} \quad (E)$$

Synthetic Example 6
Synthesis of an Organohydrogenpolysiloxane

To a flask containing a mixture of 53.6 g (22 mol %) of 1,1,3,3-tetramethyldisiloxane, 195.2 g (44 mol %) of diphenyldimethoxysilane and 144.0 g (33 mol %) of 1,3,5,7-tetramethylcyclotetrasiloxane at 10° C. were added sequentially 17.8 g of concentrated sulfuric acid and 15.4 g of pure water, and the mixture was then stirred for 12 hours to allow the hydrolysis and equilibration reaction to proceed. The reaction was then halted by adding 5.9 g of water and 195.8 g of toluene to the thus produced reaction solution and stirring, and a water washing operation in which the toluene solution was combined with water, stirred, left to stand, and the water layer subsequently removed, was repeated until the toluene layer was neutral. The organohydrogenpolysiloxane obtained by subsequent removal of the toluene by vacuum distillation was then filtered to remove impurities, and yielded 314 g of an organohydrogenpolysiloxane represented by an average composition formula (F) shown below, with a refractive index of 1.4904.

$$(C_6H_5)_{0.40}H_{0.80}(CH_3)_{1.00}SiO_{0.90} \quad (F)$$

Synthetic Example 7
Synthesis of an Organohydrogenpolysiloxane

Using the same procedure as the synthetic example 6, hydrolysis and equilibration reaction of a mixture of 29 mol % of 1,1,3,3-tetramethyldisiloxane, 57 mol % of diphenyldimethoxysilane and 14 mol % of 1,3,5,7-tetramethylcyclotetrasiloxane yielded an organohydrogenpolysiloxane represented by an average composition formula (G) shown below, with a refractive index of 1.5201.

$$(C_6H_5)_{0.67}H_{0.67}(CH_3)_{1.00}SiO_{0.83} \quad (G)$$

Synthetic Example 8
Synthesis of an Organohydrogenpolysiloxane

Using the same procedure as the synthetic example 6, hydrolysis and equilibration reaction of a mixture of 11 mol % of 1,1,3,3-tetramethyldisiloxane, 21 mol % of diphenyldimethoxysilane and 68 mol % of 1,3,5,7-tetramethylcyclotetrasiloxane yielded an organohydrogenpolysiloxane represented by an average composition formula (H) shown below, with a refractive index of 1.4353.

$$(C_6H_5)_{0.13}H_{0.93}(CH_3)_{1.00}SiO_{0.97} \quad (H)$$

Synthetic Example 9
Synthesis of an Organohydrogenpolysiloxane

Using the same procedure as the synthetic example 6, hydrolysis and equilibration reaction of a mixture of 12 mol % of hexamethyldisiloxane, 50 mol % of diphenyldimethoxysilane, 19 mol % of 1,3,5,7-tetramethylcyclotetrasiloxane and 19 mol % of octamethylcyclotetrasiloxane yielded an organohydrogenpolysiloxane represented by an average composition formula (1) shown below, with a refractive index of 1.4630.

$$(C_6H_5)_{0.44}H_{0.33}(CH_3)_{1.67}SiO_{0.78} \quad (I)$$

Synthetic Example 10
Synthesis of an Organohydrogenpolysiloxane

Using the same procedure as the synthetic example 6, hydrolysis and equilibration reaction of a mixture of 31 mol % of hexamethyldisiloxane, 31 mol % of diphenyldimethoxysilane and 38 mol % of 1,3,5,7-tetramethylcyclotetrasiloxane yielded an organohydrogenpolysiloxane represented by an average composition formula (J) shown below, with a refractive index of 1.5528.

$$(C_6H_5)_{0.25}H_{0.63}(CH_3)_{1.38}SiO_{0.87} \quad (J)$$

Example 1

100 parts by weight of the alkenyl group containing organopolysiloxane represented by (A) obtained from the synthetic example 1, 25.1 parts by weight of the organohydrogenpolysiloxane represented by (F) obtained from the synthetic example 6, 0.5 parts by weight of Surfynol 61 (a reaction control agent manufactured by Nissin Chemical Industry Co., Ltd.) and 0.5 parts by weight of PL52 (a platinum catalyst manufactured by Shin-Etsu Chemical Co., Ltd.) were mixed together to produce an addition curing type silicone resin composition with a viscosity of 125 poise.

This composition was degassed, poured into a mold of length 100 mm, width 4 mm and depth 10 mm, and subsequently cured for 30 minutes at 200° C. The composition was then removed from the mold and subjected to post curing for 90 minutes at 200° C. The thus obtained cured product displayed a flexural strength of 32.0 MPa (3.26 kgf/mm$^2$), a Shore D hardness of 70, and a transmittance at 589 nm of 90.7%.

Example 2

100 parts by weight of the alkenyl group containing organopolysiloxane represented by (A) obtained from the synthetic example 1, 36.8 parts by weight of the organohydrogenpolysiloxane represented by (G) obtained from the synthetic example 7, 0.5 parts by weight of Surfynol 61 and 0.5 parts by weight of PL52 (a platinum catalyst manufactured by Shin-Etsu Chemical Co., Ltd.) were mixed together to produce an addition curing type silicone resin composition.

This composition was degassed, poured into a mold of length 100 mm, width 4 mm and depth 10 mm, and subsequently cured for 30 minutes at 200° C. The composition was then removed from the mold and subjected to post curing for 90 minutes at 200° C. The thus obtained cured product displayed a flexural strength of 31.7 MPa (3.23 kgf/mm$^2$), a Shore D hardness of 64, and a transmittance at 589 nm of 90.1%.

Example 3

100 parts by weight of the alkenyl group containing organopolysiloxane represented by (B) obtained from the synthetic example 2, 31.3 parts by weight of the organohydrogenpolysiloxane represented by (G) obtained from the synthetic example 7, 0.5 parts by weight of Surfynol 61 and 0.5 parts by weight of PL52 (a platinum catalyst manufactured by Shin-Etsu Chemical Co., Ltd.) were mixed together to produce an addition curing type silicone resin composition with a viscosity of 250 poise.

This composition was degassed, poured into a mold of length 100 mm, width 4 mm and depth 10 mm, and subsequently cured for 30 minutes at 200° C. The composition was then removed from the mold and subjected to post curing for 90 minutes at 200° C. The thus obtained cured product displayed a flexural strength of 44.1 MPa (4.50 kgf/mm$^2$), a Shore D hardness of 67, and a transmittance at 589 nm of 86.2%.

Example 4

100 parts by weight of the alkenyl group containing organopolysiloxane represented by (C) obtained from the synthetic example 3, 43.2 parts by weight of the organohydrogenpolysiloxane represented by (G) obtained from the synthetic example 7, 0.5 parts by weight of Surfynol 61 and 0.5 parts by weight of PL52 (a platinum catalyst manufactured by Shin-Etsu Chemical Co., Ltd.) were mixed together to produce an addition curing type silicone resin composition with a viscosity of 49 poise.

This composition was degassed, poured into a mold of length 100 mm, width 4 mm and depth 10 mm, and subsequently cured for 30 minutes at 200° C. The composition was then removed from the mold and subjected to post curing for 90 minutes at 200° C. The thus obtained cured product displayed a flexural strength of 39.9 MPa (4.07 kgf/mm$^2$), a Shore D hardness of 68, and a transmittance at 589 nm of 89.7%.

Comparative Example 1

100 parts by weight of the alkenyl group containing organopolysiloxane represented by (D) obtained from the synthetic example 4, 52.5 parts by weight of the organohydrogenpolysiloxane represented by (F) obtained from the synthetic example 6, 0.5 parts by weight of Surfynol 61 and 0.5 parts by weight of PL52 (a platinum catalyst manufactured by Shin-Etsu Chemical Co., Ltd.) were mixed together to produce an addition curing type silicone resin composition.

This composition was degassed, poured into a mold of length 100 mm, width 4 mm and depth 10 mm, and subsequently cured for 30 minutes at 200° C. The composition was then removed from the mold and subjected to post curing for 90 minutes at 200° C. The thus obtained cured product displayed a flexural strength of 21.4 MPa (2.18 kgf/mm$^2$), a Shore D hardness of 75, and a transmittance at 589 nm of 89.5%.

Comparative Example 2

100 parts by weight of the alkenyl group containing organopolysiloxane represented by (A) obtained from the synthetic example 1, 16.9 parts by weight of the organohydrogenpolysiloxane represented by (H) obtained from the synthetic example 8, 0.5 parts by weight of Surfynol 61 and 0.5 parts by weight of PL52 (a platinum catalyst manufactured by Shin-Etsu Chemical Co., Ltd.) were mixed together to produce an addition curing type silicone resin composition.

This composition was degassed, poured into a mold of length 100 mm, width 4 mm and depth 10 mm, and subsequently cured for 30 minutes at 200° C. The composition was then removed from the mold and subjected to post curing for 90 minutes at 200° C. The thus obtained cured product was turbid, and displayed a flexural strength of 24.8 MPa (2.53 kgf/mm$^2$) and a Shore D hardness of 64.

Comparative Example 3

100 parts by weight of the alkenyl group containing organopolysiloxane represented by (A) obtained from the synthetic example 1, 66.6 parts by weight of the organohydrogenpolysiloxane represented by (I) obtained from the synthetic example 9, 0.5 parts by weight of Surfynol 61 and 0.5 parts by weight of PL52 (a platinum catalyst manufactured by Shin-Etsu Chemical Co., Ltd.) were mixed together to produce an addition curing type silicone resin composition.

This composition was degassed, poured into a mold of length 100 mm, width 4 mm and depth 10 mm, and subsequently cured for 30 minutes at 200° C. The composition was then removed from the mold and subjected to post curing for 90 minutes at 200° C. The thus obtained cured product displayed a flexural strength of 20.4 MPa (2.08 kgf/mm$^2$), a Shore D hardness of 50, and a transmittance at 589 nm of 86.2%.

Comparative Example 4

100 parts by weight of the alkenyl group containing organopolysiloxane represented by (E) obtained from the synthetic example 5, 30 parts by weight of the organohydrogenpolysiloxane represented by (J) obtained from the synthetic example 10, 3 parts by weight of $(C_6H_5)(CH_2=CH)(CH_3)SiOSi(C_6H_5)(CH_2=CH)(CH_3)$, 0.5 parts by weight of Surfynol 61 and 0.5 parts by weight of PL52 (a platinum catalyst manufactured by Shin-Etsu Chemical Co., Ltd.) were mixed together to produce an addition curing type silicone resin composition.

This composition was degassed, poured into a mold of length 100 mm, width 4 mm and depth 10 mm, and subsequently cured for 5 minutes at 150° C. The composition was then removed from the mold and subjected to post curing for 120 minutes at 180° C. The thus obtained cured product displayed a flexural strength of 14.7 MPa (1.50 kgf/mm²), a Shore D hardness of 70, and a transmittance at 589 nm of 88.5%.

The parameters for each of the polysiloxanes used in the above examples and comparative examples, and the cured products produced therefrom, are shown in Table 1.

TABLE 1

|  | Flexural strength MPa (kgf/mm²) | Shore D | a | b | c | ≡Si—R² + RSiO$_{3/2}$ (mol %) | d | e | f |
|---|---|---|---|---|---|---|---|---|---|
| Example 1 | 32.0 (3.26) | 70 | 0.55 | 0.30 | 0.60 | 85 | 0.40 | 0.80 | 1.00 |
| Example 2 | 31.7 (3.23) | 64 | 0.55 | 0.30 | 0.60 | 85 | 0.67 | 0.67 | 1.00 |
| Example 3 | 44.1 (4.50) | 67 | 0.85 | 0.30 | 0.30 | 85 | 0.67 | 0.67 | 1.00 |
| Example 4 | 39.9 (4.07) | 68 | 0.75 | 0.40 | 0.40 | 85 | 0.67 | 0.67 | 1.00 |
| Comparative example 1 | 21.4 (2.18) | 75 | 0.40 | 0.60 | 0.60 | 100 | 0.40 | 0.80 | 1.00 |
| Comparative example 2 | 24.8 (2.53) | 64 | 0.55 | 0.30 | 0.60 | 85 | 0.13 | 0.93 | 1.00 |
| Comparative example 3 | 20.4 (2.08) | 50 | 0.55 | 0.30 | 0.60 | 85 | 0.44 | 0.33 | 1.67 |
| Comparative example 4 | 14.7 (1.50) | 70 | 0.40 | 0.08 | 1.02 | 58 | 0.25 | 0.63 | 1.38 |

A cured product produced by curing an addition curing type silicone resin composition of the present invention is transparent, displays good strength and particularly good flexural strength, and moreover also displays a high degree of hardness. Consequently, such products can be effectively utilized in a variety of fields including electrical and electronic equipment, OA equipment and precision instruments.

What is claimed is:

1. An addition curing type silicone composition comprising:

(A) 100 parts by weight of an organopolysiloxane represented by an average composition formula (1):

wherein, $R^1$ represents a phenyl group, $R^2$ represents an alkenyl group of 2 to 10 carbon atoms, $R^3$ represents a monovalent group selected from the group consisting of monovalent hydrocarbon groups except a phenyl group and alkenyl groups, a hydroxyl group and alkoxy groups, and a, b and c are positive numbers which satisfy requirements $0.5 \leq a \leq 1.0$, $0.2 \leq b \leq 0.5$, $0.2 \leq c \leq 0.8$ and $1.0 < a+b+c < 2.0$, which incorporates a phenyl group and at least two alkenyl groups within a single molecule, and in which a combined proportion of Si atoms within ≡Si—R² groups and RSiO$_{3/2}$ units wherein, R represents either one of $R^1$ and $R^3$ as defined above relative to total Si atoms is at least 70 mol %;

(B) 1 to 100 parts by weight an organohydrogenpolysiloxane represented by an average composition formula (2):

wherein, $R^4$ represents a phenyl group, $R^5$ represents a monovalent group selected from the group consisting of monovalent hydrocarbon groups except a phenyl group, a hydroxyl group and alkoxy groups, and d, e and f are positive numbers which satisfy requirements $0.4 \leq d \leq 1.0$, $0.5 \leq e \leq 0.8$, $0.7 \leq f \leq 1.2$ and $1.8 < d+e+f < 3.0$, which incorporates a phenyl group and at least two SiH groups within a single molecule; and (C) an effective quantity of a hydrosilylation reaction catalyst, said composition, on curing, having a flexural strength measured in accordance with JIS K6911 of at least 29.4 MPa.

2. An addition curing type silicone resin composition according to claim 1, wherein a refractive index of both said organopolysiloxane represented by said average composition formula (1) and said organohydrogenpolysiloxane represented by said average composition formula (2) is from 1.47 to 1.57.

3. An addition curing type silicone resin composition according to claim 1, wherein a difference between a refractive index of said organopolysiloxane represented by said average composition formula (1) and a refractive index of said organohydrogenpolysiloxane represented by said average composition formula (2) is no more than 0.08.

4. An addition curing type silicone resin composition according to claim 1, wherein in said average composition formula (1), $R^2$ is a vinyl group, $R^3$ is any one of a methyl group, an ethyl group and a propyl group, said numbers a, b and c are positive numbers which satisfy requirements $0.55 \leq a \leq 0.95$, $0.25 \leq b \leq 0.45$ and $0.25 \leq c \leq 0.7$ respectively, and moreover a sum of said numbers satisfies a requirement $1.3 < a+b+c < 1.7$.

5. An addition curing type silicone resin composition according to claim 1, wherein in said average composition formula (2), $R^5$ is any one of a methyl group, an ethyl group and a propyl group, said numbers d, e and f are positive numbers which satisfy requirements $0.5 \leq d \leq 1.0$, $0.6 \leq e \leq 0.8$ and $0.8 \leq f \leq 1.1$ respectively, and moreover a sum of said numbers satisfies a requirement $2.0 < d+e+f < 2.5$.

6. An addition curing type silicone resin composition according to claim 1, wherein an amount of said constituent (B) is from 5 to 50 parts by weight per 100 parts by weight of said constituent (A), and an amount of said constituent (C), on a weight basis relative to said constituent (A), is from 1 to 500 pm.

7. A key pad comprising a cured product produced by heat curing an addition curing type silicone resin composition according to claim 1.

8. A cured product produced by heat curing of an addition curing type silicone resin composition according to claim 1.

9. A cured product according to claim 1, wherein said composition, on curing, has a flexural strength measured in accordance with JIS K6911 of at least 34.3 MPa.

10. A cured product according to claim 8, with a hardness (Shore D) measured using a Barcol hardness tester in accordance with JIS K7060 of at least 60.

11. A cured product according to claim 8, with a transmittance of light of wavelength 589 nm of at least 85%.

* * * * *